United States Patent
Yamamoto et al.

(10) Patent No.: US 10,784,502 B2
(45) Date of Patent: Sep. 22, 2020

(54) SLURRY COMPOSITION FOR SECONDARY BATTERY NEGATIVE ELECTRODE, NEGATIVE ELECTRODE FOR SECONDARY BATTERY, AND SECONDARY BATTERY

(71) Applicant: ZEON CORPORATION, Chiyoda-ku, Tokyo (JP)

(72) Inventors: Norikazu Yamamoto, Tokyo (JP); Shigeru Shuto, Tokyo (JP); Julien Delmas, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 15 days.

(21) Appl. No.: 15/574,836

(22) PCT Filed: May 13, 2016

(86) PCT No.: PCT/JP2016/002367
§ 371 (c)(1),
(2) Date: Nov. 17, 2017

(87) PCT Pub. No.: WO2016/199353
PCT Pub. Date: Dec. 15, 2016

(65) Prior Publication Data
US 2018/0151866 A1     May 31, 2018

(30) Foreign Application Priority Data
Jun. 8, 2015   (JP) ................. 2015-115906

(51) Int. Cl.
| | |
|---|---|
| *H01M 4/133* | (2010.01) |
| *H01M 4/587* | (2010.01) |
| *H01M 4/1393* | (2010.01) |
| *H01M 4/62* | (2006.01) |
| *H01M 10/0525* | (2010.01) |
| *C08K 3/04* | (2006.01) |
| *H01M 4/02* | (2006.01) |
| *H01M 4/04* | (2006.01) |

(52) U.S. Cl.
CPC ......... *H01M 4/133* (2013.01); *H01M 4/1393* (2013.01); *H01M 4/587* (2013.01); *H01M 4/622* (2013.01); *H01M 10/0525* (2013.01); *C08K 3/04* (2013.01); *H01M 4/0404* (2013.01); *H01M 2004/021* (2013.01); *H01M 2004/027* (2013.01)

(58) Field of Classification Search
CPC .. H01M 4/133; H01M 4/622; H01M 10/0525; H01M 10/0566; H01M 4/62; H01M 4/587; H01M 4/13; H01M 4/364; H01M 2004/021; H01M 2004/027; C08K 3/04
See application file for complete search history.

(56) References Cited

U.S. PATENT DOCUMENTS

| | | | |
|---|---|---|---|
| 2007/0059233 A1* | 3/2007 | Sheem ................... | B01J 20/20 423/445 R |
| 2013/0330622 A1 | 12/2013 | Sasaki et al. | |
| 2015/0303463 A1 | 10/2015 | Sasaki | |

FOREIGN PATENT DOCUMENTS

| | | |
|---|---|---|
| JP | 2012204303 A | 10/2012 |
| JP | 2013045714 A | 3/2013 |
| WO | 2012115096 A1 | 8/2012 |
| WO | 2014073647 A1 | 5/2014 |

OTHER PUBLICATIONS

Dec. 7, 2018, the Extended European Search Report issued by the European Patent Office in the corresponding European Patent Application No. 16807070.4.
Dec. 12, 2017, International Preliminary Report on Patentability issued in the International Patent Application No. PCT/JP2016/002367.

* cited by examiner

*Primary Examiner* — Cynthia K Walls
(74) *Attorney, Agent, or Firm* — Kenja IP Law PC

(57) ABSTRACT

Provided is a slurry composition for a secondary battery negative electrode that has excellent producibility and can suppress cell swelling and an increase in internal resistance in a secondary battery. The slurry composition for a secondary battery negative electrode contains a negative electrode active material, a particulate polymer, and water. The negative electrode active material includes a carbon-based negative electrode active material having a surface functional group content of at least 0.9% and not more than 1.5%, and a BET specific surface area of 2.5 $m^2/g$ or less. The particulate polymer has a surface acid content of at least 0.2 mmol/g and not more than 2.0 mmol/g.

14 Claims, 1 Drawing Sheet

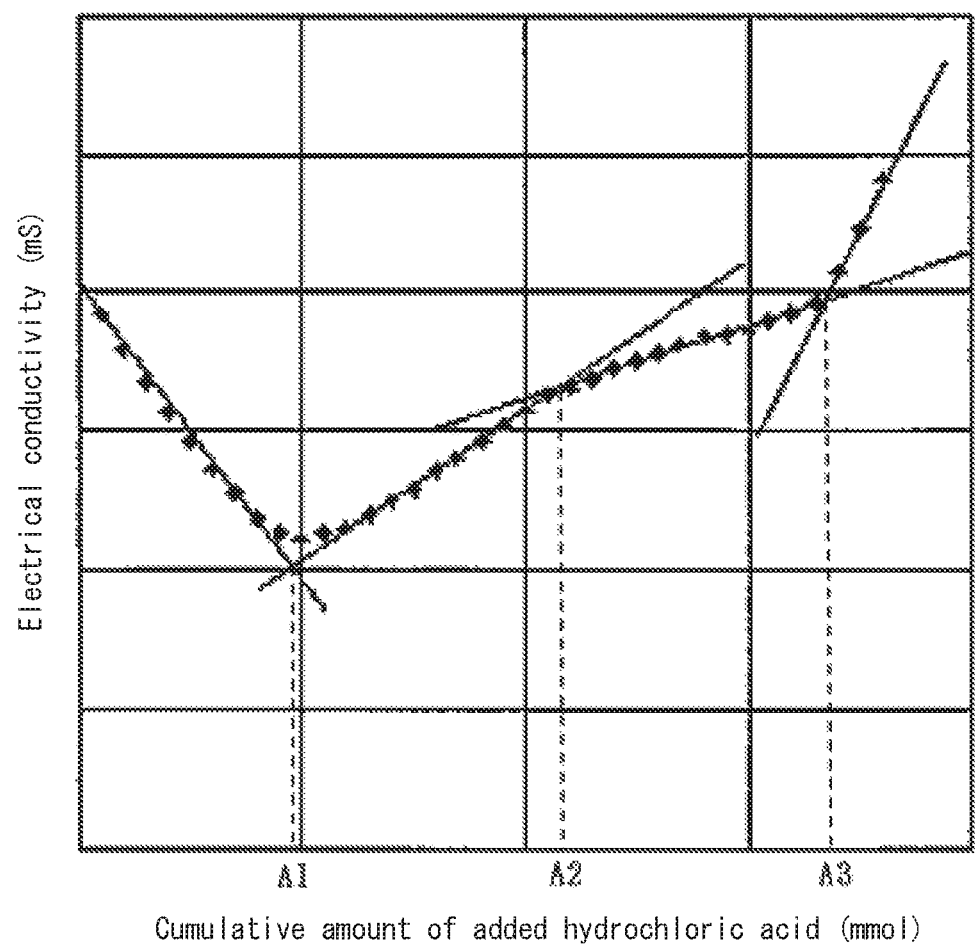

SLURRY COMPOSITION FOR SECONDARY BATTERY NEGATIVE ELECTRODE, NEGATIVE ELECTRODE FOR SECONDARY BATTERY, AND SECONDARY BATTERY

TECHNICAL FIELD

This disclosure relates to a slurry composition for a secondary battery negative electrode, a negative electrode for a secondary battery, and a secondary battery.

BACKGROUND

Secondary batteries such as lithium ion secondary batteries have characteristics such as compact size, light weight, high energy-density, and the ability to be repeatedly charged and discharged, and are used in a wide variety of applications. Consequently, in recent years, studies have been made to improve battery members such as electrodes (positive and negative electrodes) for the purpose of achieving even higher secondary battery performance.

A negative electrode for a secondary battery, such as a lithium ion secondary battery, normally includes a current collector and an electrode mixed material layer (negative electrode mixed material layer) formed on the current collector. This negative electrode mixed material layer is formed, for example, using a slurry composition obtained by dispersing and/or dissolving a negative electrode active material and a binder in a dispersion medium.

In recent years, attempts have been made to further improve the performance of secondary batteries through improvement of slurry compositions used in the formation of negative electrode mixed material layers.

In one specific example, PTL 1 proposes that a secondary battery suitable for high-rate charging and discharging can be provided by producing a negative electrode mixed material layer having a percentage content of carboxymethyl cellulose within a specific range using a slurry composition that contains, in a dispersion medium, a negative electrode active material formed from a composite carbon material having a surface functional group content of 1.0% or less as determined by X-ray photoelectron spectroscopy (XPS), carboxymethyl cellulose having a specific weight average molecular weight, and styrene-butadiene rubber.

CITATION LIST

Patent Literature

PTL 1: JP 2013-45714 A

SUMMARY

Technical Problem

Secondary batteries are known to suffer from a problem in which electrolysis solution decomposes therein to produce gas through contact with a negative electrode active material, resulting in cell swelling. In response to this problem, the inventors conceived an idea of suppressing electrolysis solution decomposition by reducing the specific surface area of the negative electrode active material such as to reduce a contact interface between the negative electrode active material and the electrolysis solution. Moreover, the inventors attempted to reduce the specific surface area of the negative electrode active material used in the conventional technique described above. However, through these attempts, it became clear that problems occur in terms of slurry composition production becoming difficult due to excessive thickening and in terms of increased secondary battery internal resistance and inadequate rate characteristics due to a decrease in sites for receiving charge carriers (lithium ions in the case of a lithium ion secondary battery).

In other words, there is still room for improvement over the conventional technique described above from a viewpoint of suppressing cell swelling and an increase in internal resistance in a secondary battery while also ensuring producibility of a slurry composition for a secondary battery negative electrode.

Accordingly, an objective of this disclosure is to provide a slurry composition for a secondary battery negative electrode that has excellent producibility and can suppress cell swelling and an increase in internal resistance in a secondary battery.

Another objective of this disclosure is to provide a negative electrode for a secondary battery that can suppress cell swelling and an increase in internal resistance in a secondary battery.

Yet another objective of this disclosure is to provide a secondary battery in which cell swelling is suppressed and that has excellent rate characteristics.

Solution to Problem

The inventors conducted diligent investigation with the aim of solving the problems set forth above. As a result, the inventors reached a new finding that when a slurry composition is produced by adding a particulate polymer having a specific surface acid content as a binder to a negative electrode active material including a carbon-based negative electrode active material having a specific surface functional group content and a specific BET specific surface area, excessive thickening at the time of addition of the particulate polymer is inhibited, and when this slurry composition is used to produce a negative electrode, cell swelling and an increase in internal resistance in a secondary battery can be suppressed, thereby enabling the secondary battery to display good battery characteristics, such as rate characteristics.

Specifically, this disclosure aims to advantageously solve the problems set forth above by disclosing a slurry composition for a secondary battery negative electrode comprising a negative electrode active material, a particulate polymer, and water, wherein the negative electrode active material includes a carbon-based negative electrode active material having a surface functional group content of at least 0.9% and not more than 1.5%, and a BET specific surface area of 2.5 $m^2/g$ or less, and the particulate polymer has a surface acid content of at least 0.2 mmol/g and not more than 2.0 mmol/g. Through use of a carbon-based negative electrode active material having a specific surface functional group content and a specific BET specific surface area, and a particulate polymer having a specific surface acid content in this manner, a slurry composition can be produced without excessive thickening, and cell swelling and an increase in internal resistance in a secondary battery can be suppressed.

In this disclosure, "surface functional group content" refers to a value expressed by the ratio of carbon atom (C) concentration and oxygen atom (O) concentration at the surface of a carbon-based negative electrode active material as determined by X-ray photoelectron spectroscopy. Note that this value is also referred to as the "O/C value". The "surface functional group content" can be calculated using a method described in the EXAMPLES section of the present specification.

Moreover, in this disclosure, "BET specific surface area" refers to the BET specific surface area according to nitrogen adsorption and can be measured in accordance with ASTM D3037-81.

Furthermore, in this disclosure, "surface acid content" refers to the amount of acid that is present at a surface part of a particulate polymer, and indicates the acid content per 1 g of solid content of the particulate polymer. The "surface acid content" can be calculated using a method described in the EXAMPLES section of the present specification.

In the presently disclosed slurry composition for a secondary battery negative electrode, a functional group content/acid content ratio X calculated by formula (1)

$$X=(S/T)/U \qquad (1)$$

is preferably at least 1.51 and not more than 4.50, where S represents the surface functional group content of the carbon-based negative electrode active material in %, T represents the BET specific surface area of the carbon-based negative electrode active material in m$^2$/g, and U represents the surface acid content of the particulate polymer in mmol/g. As a result of the value of the functional group content/acid content ratio X being within the range set forth above, slurry composition producibility can be further increased while also further suppressing cell swelling and an increase in internal resistance in a secondary battery.

Moreover, in the presently disclosed slurry composition for a secondary battery negative electrode, the BET specific surface area of the carbon-based negative electrode active material is preferably 1.0 m$^2$/g or more. As a result of the BET specific surface area of the carbon-based negative electrode active material being 1.0 m$^2$/g or more, an increase in internal resistance in a secondary battery can be further suppressed.

Furthermore, in the presently disclosed slurry composition for a secondary battery negative electrode, the particulate polymer preferably has a volume average particle diameter D50 of at least 120 nm and not more than 500 nm. As a result of the volume average particle diameter D50 of the particulate polymer being within the range set forth above, slurry composition producibility can be further increased while also further suppressing cell swelling in a secondary battery, and negative electrode peel strength can be improved.

In this disclosure, "volume average particle diameter D50" refers to a particle diameter that in a particle size distribution (volume basis) measured by laser diffraction, is a particle diameter at which the cumulative volume calculated from a small diameter end of the distribution reaches 50%.

The presently disclosed slurry composition for a secondary battery negative electrode preferably further comprises a conductive material having a BET specific surface area of 30 m$^2$/g or more in an amount of at least 0.2 parts by mass and not more than 2 parts by mass per 100 parts by mass of the negative electrode active material. As a result of the slurry composition containing a conductive material having a BET specific surface area of 30 m$^2$/g or more in an amount within the range set forth above, cell swelling and an increase in internal resistance in a secondary battery can be further suppressed.

Moreover, the presently disclosed slurry composition for a secondary battery negative electrode preferably further comprises a water-soluble polymer having a 1 mass % aqueous solution viscosity of at least 150 mPa·s and not more than 2,000 mPa·s. As a result of the slurry composition containing a water-soluble polymer having a 1 mass % aqueous solution viscosity as set forth above, an increase in internal resistance in a secondary battery can be further suppressed.

In this disclosure, the "1 mass % aqueous solution viscosity" can be measured in accordance with JIS K7117-1 using a B-type viscometer under conditions of a temperature of 25° C., a pH of 8, an M4 rotor, and a rotation speed of 60 rpm.

Moreover, this disclosure aims to advantageously solve the problems set forth above by disclosing a negative electrode for a secondary battery comprising a negative electrode mixed material layer obtained using any one of the slurry compositions for a secondary battery negative electrode set forth above. Through use of a negative electrode obtained in this manner using any one of the slurry compositions for a secondary battery negative electrode set forth above, cell swelling and an increase in internal resistance in a secondary battery can be sufficiently suppressed.

Furthermore, this disclosure aims to advantageously solve the problems set forth above by disclosing a secondary battery comprising a positive electrode, a negative electrode, a separator, and an electrolysis solution, wherein the negative electrode is the negative electrode for a secondary battery set forth above. In a secondary battery including the negative electrode for a secondary battery set forth above in this manner, cell swelling is suppressed, and the secondary battery has excellent battery characteristics, such as rate characteristics.

Advantageous Effect

According to this disclosure, it is possible to provide a slurry composition for a secondary battery negative electrode that has excellent producibility and can suppress cell swelling and an increase in internal resistance in a secondary battery.

Moreover, according to this disclosure, it is possible to provide a negative electrode for a secondary battery that can suppress cell swelling and an increase in internal resistance in a secondary battery.

Furthermore, according to this disclosure, it is possible to provide a secondary battery in which cell swelling is suppressed and that has excellent rate characteristics.

BRIEF DESCRIPTION OF THE DRAWING

In the accompanying drawing,

FIGURE is a graph illustrating a hydrochloric acid additive amount-electrical conductivity curve that is prepared in calculation of the surface acid content of a particulate polymer.

DETAILED DESCRIPTION

The following provides a detailed description of embodiments of this disclosure.

The presently disclosed slurry composition for a secondary battery negative electrode is used to form a negative electrode of a secondary battery. Moreover, the presently disclosed negative electrode for a secondary battery includes a negative electrode mixed material layer formed from the presently disclosed slurry composition for a secondary battery negative electrode. Furthermore, the presently disclosed secondary battery includes the presently disclosed negative electrode for a secondary battery.

(Slurry Composition for Secondary Battery Negative Electrode)

The presently disclosed slurry composition for a secondary battery negative electrode is a composition in which a negative electrode active material and a binder are dispersed in an aqueous medium serving as a dispersion medium. The presently disclosed slurry composition for a secondary battery negative electrode contains a carbon-based negative electrode active material having a surface functional group content of at least 0.9% and not more than 1.5%, and a BET specific surface area of 2.5 $m^2/g$ or less as the negative electrode active material and contains a particulate polymer having a surface acid content of at least 0.2 mmol/g and not more than 2.0 mmol/g as the binder.

As a result of the above-described carbon-based negative electrode active material and the above-described particulate polymer being used together in the presently disclosed slurry composition for a secondary battery negative electrode, it is possible to inhibit excessive thickening during production of the slurry composition. Moreover, through use of this slurry composition, it is possible to produce a negative electrode that can suppress cell swelling and an increase in internal resistance in a secondary battery.

<Negative Electrode Active Material>

The negative electrode active material is a material that accepts and donates electrons in a negative electrode of a secondary battery. In the case of a lithium ion secondary battery, for example, the negative electrode active material is normally a material that can occlude and release lithium. Examples of the material that can occlude and release lithium include a carbon-based negative electrode active material, a non-carbon-based negative electrode active material, and an active material formed by combining these two.

In the presently disclosed slurry composition for a secondary battery negative electrode, it is essential to use at least a carbon-based negative electrode active material having a surface functional group content of at least 0.9% and not more than 1.5%, and a BET specific surface area of 2.5 $m^2/g$ or less as the negative electrode active material.

[Carbon-Based Negative Electrode Active Material]

Herein, "carbon-based negative electrode active material" refers to an active material having a main framework of carbon into which lithium can be inserted (also referred to as "doping"). The following provides a detailed description of the carbon-based negative electrode active material having the specific properties set forth above. However, it should be noted that the presently disclosed slurry composition for a secondary battery negative electrode may also contain a carbon-based negative electrode active material that does not have these specific properties.

[[Surface Functional Group Content]]

The surface functional group content (O/C value) of the carbon-based negative electrode active material is required to be at least 0.9% and not more than 1.5%, is preferably 1.0% or more, more preferably more than 1.0%, and even more preferably 1.1% or more, and is preferably 1.4% or less, and more preferably 1.3% or less. If the surface functional group content of the carbon-based negative electrode active material is less than 0.9%, rate characteristics of a secondary battery cannot be ensured due to an increase in internal resistance of the secondary battery. On the other hand, if the surface functional group content of the carbon-based negative electrode active material is more than 1.5%, favorable dispersion of the carbon-based negative electrode active material is impeded by excessively strong interaction among the carbon-based negative electrode active material, leading to a decrease in slurry composition producibility.

Note that the surface functional group content of the carbon-based negative electrode active material can be adjusted by changing the strength of mechanochemical treatment described further below. Specifically, the surface functional group content can be increased by increasing the rotation speed of a device used for the mechanochemical treatment during pulverization.

[[BET Specific Surface Area]]

The BET specific surface area of the carbon-based negative electrode active material is required to be 2.5 $m^2/g$ or less, is preferably 2.3 $m^2/g$ or less, more preferably 2.2 $m^2/g$ or less, and even more preferably 2.0 $m^2/g$ or less, and is preferably 1.0 $m^2/g$ or more, more preferably 1.1 $m^2/g$ or more, and even more preferably 1.2 $m^2/g$ or more. If the BET specific surface area of the carbon-based negative electrode active material is more than 2.5 $m^2/g$, the contact interface between the negative electrode active material and an electrolysis solution increases, and cell swelling due to decomposition of the electrolysis solution cannot be sufficiently suppressed. On the other hand, when the BET specific surface area of the carbon-based negative electrode active material is 1.0 $m^2/g$ or more, an increase in internal resistance in a secondary battery can be suppressed and rate characteristics of the secondary battery can be further increased.

The method by which the BET specific surface area of the carbon-based negative electrode active material is adjusted is not specifically limited and can be a commonly known method. For example, the BET specific surface area can be increased in the same way as the surface functional group content by increasing the rotation speed of a device used for mechanochemical treatment during pulverization.

[[Production Method of Carbon-Based Negative Electrode Active Material]]

The production method of the carbon-based negative electrode active material having the specific properties set forth above is not specifically limited and may, for example, be through mechanochemical treatment of a commonly known carbon-based negative electrode active material.

Examples of commonly known carbon-based negative electrode active materials include carbonaceous materials and graphitic materials.

A carbonaceous material is a material with a low degree of graphitization (i.e., low crystallinity) that can be obtained by carbonizing a carbon precursor by heat treatment at 2000° C. or lower. The lower limit of the heat treatment temperature in the carbonization is not specifically limited and may for example be 500° C. or higher.

Examples of the carbonaceous material include graphitizing carbon whose carbon structure can easily be changed according to the heat treatment temperature and non-graphitizing carbon typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

The graphitic material is a material having high crystallinity of a similar level to graphite. The graphitic material can be obtained by heat-treating graphitizing carbon at 2000° C. or higher. The upper limit of the heat treatment temperature is not specifically limited and may for example be 5000° C. or lower.

Examples of the graphitic material include natural graphite and artificial graphite.

Examples of the artificial graphite include artificial graphite obtained by heat-treating carbon that contains graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

Another example of a commonly known carbon-based negative electrode active material is a composite carbon material described in JP 2013-45714 A in which the surfaces of core particles formed from high-crystallinity carbon are coated with low-crystallinity carbon.

Herein, "mechanochemical treatment" refers to treatment in which pulverization treatment of a solid material is carried out through mechanical energy, such as friction and compression, and in which localized high energy arising during this treatment is used to cause a chemical reaction of the solid material that is a treatment target, such as a crystallization reaction, a solid solution reaction, or a phase transition reaction.

Through mechanochemical treatment of a commonly known carbon-based negative electrode active material such as described above, a large number of functional groups (typically oxygen atom-containing functional groups) can be formed at the surface of the carbon-based negative electrode active material. The conditions of the mechanochemical treatment can be set as appropriate depending on the desired surface functional group content and BET specific surface area.

[Non-Carbon-Based Negative Electrode Active Material]

The non-carbon-based negative electrode active material is an active material that is not a carbon-based negative electrode active material. Examples of the non-carbon-based negative electrode active material include a metal-based negative electrode active material.

The metal-based negative electrode active material is an active material that contains metal, the structure of which usually contains an element that allows insertion of lithium, and that exhibits a theoretical electric capacity of 500 mAh/g or higher per unit mass when lithium is inserted. Examples of the metal-based negative electrode active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal.

Of these metal-based negative electrode active materials, active materials containing silicon (silicon-based negative electrode active materials) are preferred. The capacity of a lithium ion secondary battery can be increased though use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

The silicon-containing alloy may for example be an alloy composition that contains silicon and at least one element selected from the group consisting of titanium, iron, cobalt, nickel, and copper.

Alternatively, the silicon-containing alloy may for example be an alloy composition that contains silicon, aluminum, and transition metals such as iron, and further contains rare-earth elements such as tin and yttrium.

$SiO_x$ is a compound including Si and at least one of SiO and $SiO_2$, where x is normally at least 0.01 and less than 2. $SiO_x$ can for example be formed by utilizing a disproportionation reaction of silicon monoxide (SiO). Specifically, $SiO_x$ can be prepared by heat-treating SiO, optionally in the presence of a polymer such as polyvinyl alcohol, to produce silicon and silicon dioxide. After SiO has optionally been pulverized and mixed with the polymer, the heat treatment can be performed at a temperature of 900° C. or higher, and preferably 1000° C. or higher, in an atmosphere containing organic gas and/or vapor.

The composite of a Si-containing material and conductive carbon may be a compound obtained, for example, by heat-treating a pulverized mixture of SiO, a polymer such as polyvinyl alcohol, and optionally a carbon material in an atmosphere containing organic gas and/or vapor. Furthermore, a commonly known method can be used to obtain the composite, such as a method of coating the surfaces of particles of SiO with organic gas or the like by chemical vapor deposition, or a method of forming composite particles (granulation) by mechanochemical treatment using SiO particles and graphite or artificial graphite.

In the negative electrode active material used in the presently disclosed slurry composition, the percentage content of the non-carbon-based negative electrode active material is preferably less than 30 mass %, more preferably less than 15 mass %, even more preferably less than 10 mass %, particularly preferably less than 5 mass %, and most preferably 0 mass %. When the percentage content of the non-carbon-based negative electrode active material in the negative electrode active material is less than 30 mass %, the effects achieved through combined use of the carbon-based negative electrode active material having specific properties and the subsequently described particulate polymer can be sufficiently displayed, and thus improvement of producibility of the slurry composition and suppression of cell swelling and an increase in internal resistance in a secondary battery can be achieved in a good balance.

<Particulate Polymer>

In a negative electrode including a negative electrode mixed material layer formed using the presently disclosed slurry composition for a secondary battery negative electrode, the particulate polymer binds components in the negative electrode mixed material layer to one another, or binds these components to a current collector. The particulate polymer may be a polymer that can be dispersed in an aqueous medium such as water.

[Surface Acid Content]

Herein, the surface acid content of the particulate polymer is required to be at least 0.2 mmol/g and not more than 2.0 mmol/g, is preferably 0.22 mmol/g or more, and is preferably 1.5 mmol/g or less, more preferably 1.3 mmol/g or less, even more preferably 1.0 mmol/g or less, and particularly preferably 0.8 mmol/g or less. If the surface acid content of the particulate polymer is less than 0.2 mmol/g, it is not possible to achieve sufficient interaction between the particulate polymer and the carbon-based negative electrode active material having the specific properties set forth above. Consequently, thickening due to aggregation of the carbon-based negative electrode active material cannot be suppressed and slurry composition producibility cannot be ensured. Moreover, the stability of the particulate polymer in water is reduced and appropriate dispersibility of the particulate polymer in water cannot be ensured. This reduces coating density of the slurry composition on a current collector and has a negative impact on cell swelling. On the other hand, if the surface acid content of the particulate polymer is more than 2.0 mmol/g, sufficient negative electrode peel strength cannot be ensured and battery characteristics (for example, rate characteristics) of a secondary battery are reduced.

In this disclosure, the "surface acid content" can be calculated by the following method.

First, a water dispersion containing the particulate polymer is prepared. The water dispersion containing the particulate polymer is added into a glass container that has been cleaned with distilled water, an electrolytic-conductivity meter is set up, and the water dispersion is stirred. Note that the stirring is continued until the subsequently described addition of hydrochloric acid is complete.

A 0.1 N sodium hydroxide aqueous solution is added to the water dispersion containing the particulate polymer so that the electrical conductivity of the water dispersion containing the particulate polymer becomes 2.5 mS to 3.0 mS. The electrical conductivity is then measured after 6 minutes elapse. The resulting value is taken to be the electrical conductivity at the start of measurement.

Next, 0.5 mL of 0.1 N hydrochloric acid is added to the water dispersion containing the particulate polymer and the electrical conductivity is measured 30 seconds after this addition. Subsequently, a further 0.5 mL of 0.1 N hydrochloric acid is added and the electrical conductivity is measured 30 seconds after this addition. This operation is repeated in 30 second intervals until the electrical conductivity of the water dispersion containing the particulate polymer rises to at least as high as the electrical conductivity at the start of measurement.

The resulting electrical conductivity data are plotted on a graph with the electrical conductivity (units: mS) on the vertical axis (y-coordinate axis) and the cumulative amount of added hydrochloric acid (units: mmol) on the horizontal axis (x-coordinate axis). In this manner, a hydrochloric acid additive amount-electrical conductivity curve with three inflection points is obtained as illustrated in FIGURE. The x-coordinates of the three inflection points and the x-coordinate at the end of hydrochloric acid addition are taken to be P1, P2, P3, and P4 in order from a smallest value. For the data in each of four sections (section from the zero x-coordinate to the coordinate P1, section from the coordinate P1 to the coordinate P2, section from the coordinate P2 to the coordinate P3, and section from the coordinate P3 to the coordinate P4), linear approximations L1, L2, L3, and L4 are calculated by the least squares method. The x-coordinate of the intersection between the linear approximation L1 and the linear approximation L2 is defined as A1 (mmol), the x-coordinate of the intersection between the linear approximation L2 and the linear approximation L3 is defined as A2 (mmol), and the x-coordinate of the intersection between the linear approximation L3 and the linear approximation L4 is defined as A3 (mmol).

The surface acid content per 1 g of the particulate polymer is given by the following formula (a) as a value (mmol/g) in terms of hydrochloric acid. The amount of acid in an aqueous phase per 1 g of the particulate polymer (the amount of acid per 1 g of solid content of the particulate polymer that is present in an aqueous phase in the water dispersion containing the particulate polymer; also referred to as the "amount of acid in an aqueous phase of the particulate polymer") is given by the following formula (b) as a value (mmol/g) in terms of hydrochloric acid. Moreover, the total amount of acid per 1 g of the particulate polymer dispersed in water is the total of formula (a) and formula (b), expressed by the following formula (c).

Surface acid content per 1 g of particulate polymer= (A2−A1)/Solid content of particulate polymer in water dispersion         (a)

Amount of acid in aqueous phase per 1 g of particulate polymer=(A3−A2)/Solid content of particulate polymer in water dispersion         (b)

Total amount of acid per 1 g of particulate polymer dispersed in water=(A3−A1)/Solid content of particulate polymer in water dispersion         (c)

The surface acid content of the particulate polymer can be adjusted by altering the type and amount of monomers used in production of a polymer used as the particulate polymer. Specifically, the surface acid content can be increased by increasing the used amount of an acidic group-containing monomer, such as a carboxylic acid group-containing monomer.

[Volume Average Particle Diameter D50]

The volume average particle diameter D50 of the particulate polymer used in the presently disclosed slurry composition for a secondary battery negative electrode is preferably 120 nm or more, and more preferably 130 nm or more, and is preferably 500 nm or less, and more preferably 250 nm or less. When the volume average particle diameter D50 of the particulate polymer is 120 nm or more, good interaction can be achieved between the particulate polymer and the carbon-based negative electrode active material having the specific properties set forth above. Consequently, producibility of the slurry composition can be further improved through suppression of thickening caused by aggregation of the carbon-based negative electrode active material. Moreover, good dispersibility of the particulate polymer in the slurry composition can be ensured, coating density of the slurry composition on a current collector can be increased, cell swelling can be further suppressed, and negative electrode peel strength can be increased. On the other hand, when the volume average particle diameter D50 of the particulate polymer is 500 nm or less, a decrease in the contact area between the particulate polymer and components bound through the particulate polymer or between the particulate polymer and a current collector can be suppressed and negative electrode peel strength can be increased.

The volume average particle diameter D50 of the particulate polymer can be adjusted by altering the production conditions of a polymer used as the particulate polymer. Specifically, in a case in which the polymer used as the particulate polymer is, for example, produced by seeded polymerization, the volume average particle diameter D50 of the particulate polymer can be controlled by adjusting the number and diameter of seed particles used in polymerization.

[Type of Particulate Polymer]

Examples of the particulate polymer include known polymers such as diene polymers, acrylic polymers, fluoropolymers, and silicone polymers. One of these polymers may be used individually, or two or more of these polymers may be used in combination in a freely selected ratio.

Specifically, the particulate polymer is preferably a diene polymer and, in particular, a copolymer including an aliphatic conjugated diene monomer unit and an aromatic vinyl monomer unit, or a hydrogenated product thereof.

When the particulate polymer is formed from a copolymer including an aliphatic conjugated diene monomer unit that is a flexible repeat unit with low rigidity and is capable of increasing binding capacity, and an aromatic vinyl monomer unit capable of decreasing the solubility of the polymer in an electrolysis solution to increase the stability of the particulate polymer in the electrolysis solution, the particulate polymer can function as a good binder.

[[Monomers Used in Production of Copolymer Including Aliphatic Conjugated Diene Monomer Unit and Aromatic Vinyl Monomer Unit]]

In a situation in which a copolymer including an aliphatic conjugated diene monomer unit and an aromatic vinyl monomer unit is used as the particulate polymer, examples of aliphatic conjugated diene monomers that can be used to form the aliphatic conjugated diene monomer unit include, but are not specifically limited to, 1,3-butadiene, 2-methyl-1,3-butadiene, 2,3-dimethyl-1,3-butadiene, 2-chloro-1,3-butadiene, substituted linear conjugated pentadienes, and substituted and branched conjugated hexadienes. One aliphatic conjugated diene monomer may be used individually, or two or more aliphatic conjugated diene monomers may be used in combination in a freely selected ratio.

The percentage content of the aliphatic conjugated diene monomer unit in the particulate polymer is preferably 20 mass % or more, and more preferably 30 mass % or more, and is preferably 70 mass % or less, and more preferably 60 mass % or less. When the percentage content of the aliphatic conjugated diene monomer unit is 20 mass % or more, the flexibility of a negative electrode formed using the slurry composition can be increased. Moreover, when the percentage content of the aliphatic conjugated diene monomer unit is 70 mass % or less, binding strength of the particulate polymer can be sufficiently increased, good binding of components of a negative electrode mixed material layer to one another and of the negative electrode mixed material layer to a current collector can be achieved, and negative electrode peel strength can be increased.

Examples of aromatic vinyl monomers that can be used to form the aromatic vinyl monomer unit include, but are not specifically limited to, styrene, α-methylstyrene, vinyltoluene, and divinylbenzene. One aromatic vinyl monomer may be used individually, or two or more aromatic vinyl monomers may be used in combination in a freely selected ratio.

The percentage content of the aromatic vinyl monomer unit in the particulate polymer is preferably 30 mass % or more, and more preferably 40 mass % or more, and is preferably 80 mass % or less, and more preferably 70 mass % or less. When the percentage content of the aromatic vinyl monomer unit is 30 mass % or more, electrolysis solution resistance of a negative electrode formed using the slurry composition can be improved. Moreover, when the percentage content of the aromatic vinyl monomer unit is 80 mass % or less, binding strength of the particulate polymer formed from the copolymer can be sufficiently increased, good binding of components of a negative electrode mixed material layer to one another and of the negative electrode mixed material layer to a current collector can be achieved, and negative electrode peel strength can be increased.

The copolymer including the aliphatic conjugated diene monomer unit and the aromatic vinyl monomer unit preferably includes a 1,3-butadiene unit as the aliphatic conjugated diene monomer unit and a styrene unit as the aromatic vinyl monomer unit (i.e., is preferably a styrene-butadiene copolymer or a hydrogenated styrene-butadiene copolymer).

The copolymer (particulate polymer) including the aliphatic conjugated diene monomer unit and the aromatic vinyl monomer unit preferably further includes an acidic group-containing monomer unit in view of the requirement for the particulate polymer used herein to have the surface acid content set forth above. Examples of acidic group-containing monomer units that can be used include an ethylenically unsaturated carboxylic acid monomer unit and a sulfonate group-containing unsaturated monomer unit. Of these monomer units, it is preferable that the particulate polymer includes an ethylenically unsaturated carboxylic acid monomer unit.

Examples of ethylenically unsaturated carboxylic acid monomers that can be used to form the ethylenically unsaturated carboxylic acid monomer unit include ethylenically unsaturated monocarboxylic acids, derivatives of ethylenically unsaturated monocarboxylic acids, ethylenically unsaturated dicarboxylic acids, acid anhydrides of ethylenically unsaturated dicarboxylic acids, and derivatives of ethylenically unsaturated dicarboxylic acids and acid anhydrides thereof.

Examples of ethylenically unsaturated monocarboxylic acids that can be used include acrylic acid, methacrylic acid, and crotonic acid. Examples of derivatives of ethylenically unsaturated monocarboxylic acids that can be used include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids that can be used include maleic acid, fumaric acid, and itaconic acid. Examples of acid anhydrides of ethylenically unsaturated dicarboxylic acids that can be used include maleic anhydride, diacrylic acid anhydride, methyl maleic anhydride, and dimethyl maleic anhydride. Examples of derivatives of ethylenically unsaturated dicarboxylic acids that can be used include methylmaleic acid, dimethylmaleic acid, phenylmaleic acid, chloromaleic acid, dichloromaleic acid, fluoromaleic acid, diphenyl maleate, nonyl maleate, decyl maleate, dodecyl maleate, octadecyl maleate, and fluoroalkyl maleate. Of these monomers, ethylenically unsaturated monocarboxylic acids are preferable, and acrylic acid is particularly preferable.

One of these monomers may be used individually, or two or more of these monomers may be used in combination in a freely selected ratio.

Examples of sulfonate group-containing unsaturated monomers that can be used to form a sulfonate group-containing unsaturated monomer unit include vinyl sulfonic acid, methyl vinyl sulfonic acid, (meth)allyl sulfonic acid, styrene sulfonic acid, (meth)acrylic acid-2-ethyl sulfonate, 2-acrylamido-2-methylpropane sulfonic acid, and 3-allyloxy-2-hydroxypropane sulfonic acid. One of these monomers may be used individually, or two or more of these monomers may be used in combination in a freely selected ratio. In the present specification, "(meth)acryl" is used to indicate "acryl" and/or "methacryl".

The percentage content of the acidic group-containing monomer unit in the particulate polymer is preferably 1 mass % or more, more preferably 2 mass % or more, and particularly preferably 3 mass % or more, and is preferably 15 mass % or less, more preferably 13 mass % or less, and particularly preferably 10 mass % or less. When the percentage content of the acidic group-containing monomer unit is 1 mass % or more, the surface acid content of the particulate polymer can easily be increased to within the range desired herein and a lithium ion secondary battery can be provided with excellent battery characteristics while suppressing negative electrode swelling. On the other hand, when the percentage content of the acidic group-containing monomer unit is 15 mass % or less, the particulate polymer can be easily produced.

The copolymer (particulate polymer) including the aliphatic conjugated diene monomer unit and the aromatic vinyl monomer unit set forth above preferably further includes a hydroxy group-containing (meth)acrylic acid ester monomer unit.

Examples of hydroxy group-containing (meth)acrylic acid ester monomers that can be used to form the hydroxy group-containing (meth)acrylic acid ester monomer unit include 2-hydroxyethyl acrylate, 2-hydroxyethyl methacrylate, hydroxypropyl acrylate, hydroxypropyl methacrylate, hydroxybutyl acrylate, hydroxybutyl methacrylate, and 3-chloro-2-hydroxypropyl methacrylate. Of these monomers, 2-hydroxyethyl acrylate is preferable.

One of these monomers may be used individually, or two or more of these monomers may be used in combination in a freely selected ratio.

The percentage content of the hydroxy group-containing (meth)acrylic acid ester monomer unit in the particulate polymer is preferably 0.5 mass % or more, more preferably 0.7 mass % or more, and particularly preferably 0.8 mass % or more, and is preferably 5 mass % or less, more preferably 4 mass % or less, and particularly preferably 3 mass % or less. When the percentage content of the hydroxy group-containing (meth)acrylic acid ester monomer unit is 0.5 mass % or more, copolymerizability of an acidic group-containing monomer, such as an ethylenically unsaturated carboxylic acid monomer, and other monomers can be increased. On the other hand, when the percentage content of the hydroxy group-containing (meth)acrylic acid ester monomer unit is 5 mass % or less, copolymerization of the monomers set forth above can proceed favorably because polymerization of hydroxy group-containing (meth)acrylic acid ester monomer molecules to one another to form a polymer is inhibited and copolymerizability of an ethylenically unsaturated carboxylic acid monomer to the particulate polymer is improved.

Furthermore, the copolymer including the aliphatic conjugated diene monomer unit and the aromatic vinyl monomer unit set forth above may optionally include repeat units other than those described above to an extent that does not lead to significant loss of the effects disclosed herein. Although the percentage content of such other repeat units is not specifically limited, an upper limit in terms of the total amount thereof is preferably 6 mass % or less, more preferably 4 mass % or less, and particularly preferably 2 mass % or less.

[Production Method of Particulate Polymer]

The particulate polymer can be produced through polymerization of a monomer composition that contains the monomers set forth above carried out in an aqueous solvent.

In this disclosure, the percentage content of each of the monomers in the monomer composition can be set in accordance with the percentage content of each of the monomer units (repeat units) in the particulate polymer.

Although no specific limitations are placed on the aqueous solvent so long as the particulate polymer can be dispersed in a particulate state therein, water is particularly preferable from a viewpoint of being non-flammable and making it easy to obtain a dispersion of particles of the particulate polymer. Water may be used as a main solvent with another solvent other than water being mixed in to the extent that a dispersed state of particles of the particulate polymer can still be ensured.

The mode of polymerization is not specifically limited and may, for example, be solution polymerization, suspension polymerization, bulk polymerization, or emulsion polymerization. Examples of methods of polymerization that can be used include ionic polymerization, radical polymerization, and living radical polymerization. Emulsion polymerization is particularly preferable from a viewpoint of production efficiency. With emulsion polymerization, high molecular weight product can easily be produced, and the polymerized product can be obtained in a dispersed state in water, which eliminates the need to re-disperse the product, and thus allows the product to be directly used in production of the presently disclosed binder composition or the presently disclosed slurry composition. The emulsion polymerization can be carried out by a standard method. Moreover, seeded polymerization using seed particles may be adopted in the emulsion polymerization.

Commonly used emulsifiers, dispersants, polymerization initiators, polymerization aids, and the like may be used in the polymerization in an amount that is also the same as commonly used.

The particulate polymer used herein can be produced using batch polymerization or semi-batch polymerization, but use of semi-batch polymerization in which monomers are continuously or intermittently added to the reaction system is preferable. Semi-batch polymerization facilitates control of the surface acid content of the particulate polymer compared to batch polymerization in which an acidic group-containing monomer, such as an ethylenically unsaturated carboxylic acid monomer, is added to the reaction system at the start in a single addition.

In a situation in which, for example, the particulate polymer is a copolymer including the aliphatic conjugated diene monomer unit and the aromatic vinyl monomer unit set forth above, the method by which the particulate polymer is produced by semi-batch polymerization is preferably a method in which a primary monomer composition containing an aliphatic conjugated diene monomer, an aromatic vinyl monomer, and an acidic group-containing monomer is added continuously or intermittently to the reaction system, and once the monomer composition addition rate reaches 70% or more, addition of a secondary monomer composition containing a hydroxy group-containing (meth)acrylic acid ester monomer is initiated to obtain a particulate polymer. The following provides a more detailed description of this preferable embodiment.

Note that "added continuously or intermittently" refers to addition of the monomer composition to the reaction system over a certain time (for example, 30 minutes or more) and not in a single addition.

Moreover, the "monomer composition addition rate" is the proportion (mass %) of monomers already added to the reaction system among the total monomer composition used in polymerization.

The "primary monomer composition" is a monomer composition that is added to the reaction system from an initial stage of polymerization. The primary monomer composition preferably includes 80 mass % to 99 mass % and more preferably 90 mass % to 99 mass % of the total monomer composition used in polymerization. The primary monomer composition preferably contains the aromatic vinyl monomer, the aliphatic conjugated diene monomer, and the acidic group-containing monomer, and preferably does not substantially contain the hydroxy group-containing (meth) acrylic acid ester monomer.

In production of the particulate polymer by semi-batch polymerization, a polymerization reaction is initiated by, for example, adding a mixture of the primary monomer composition with an emulsifier, chain transfer agent, water, and the like as appropriate and a separately prepared polymerization initiator into a single reaction vessel. Although no specific limitations are placed on the reaction conditions in this polymerization reaction, a reaction temperature of 60° C. to 90° C. is preferable. Moreover, the time that it takes for the monomer composition addition rate to reach 70% after initiation of polymerization is not specifically limited, but is preferably 2 hours to 6 hours, and more preferably 3 hours to 5 hours.

Addition of the secondary monomer composition containing the hydroxy group-containing (meth)acrylic acid ester monomer is started once the monomer composition addition rate reaches 70% or more (i.e., at the point at which 70 mass % of the total monomer composition used in polymerization has been added to the reaction system or later). The time from the start of addition of the secondary monomer composition to the end of addition of the secondary monomer composition is not specifically limited, but is preferably 1 hour to 3 hours. Subsequent addition of the hydroxy group-containing (meth)acrylic acid ester monomer in this manner enables copolymerization of the acidic group-containing monomer and other monomers to proceed favorably and facilitates control of the surface acid content.

Note that addition of the primary monomer composition and the secondary monomer composition may end separately or at the same time. The time from initiation of polymerization to the end of addition of the total monomer composition is not specifically limited, but is preferably 3 hours to 8 hours, and more preferably 4 hours to 7 hours. After addition of the total monomer composition is completed, it is preferable that the reaction is continued for 3 hours to 9 hours at 0° C. to 90° C.

The reaction is subsequently terminated through cooling once a sufficient polymerization conversion rate is reached (for example, 95% or more).

After the polymerization described above, the resulting water dispersion may be adjusted to a pH of normally at least 5 and not higher than 10, and preferably 9 or lower, using a basic aqueous solution containing a hydroxide of an alkali metal (for example, Li, Na, K, Rb, or Cs), ammonia, an inorganic ammonium compound (for example, $NH_4Cl$), an organic amine compound (for example, ethanolamine or diethylamine), or the like to obtain a water dispersion of the particulate polymer. Of these examples, pH adjustment using an alkali metal hydroxide is preferable because it enables improvement of negative electrode peel strength.

It is preferable that unreacted monomers are removed by thermal-vacuum distillation after the pH adjustment.

[Amount of Particulate Polymer]

The amount of the particulate polymer that is contained in the presently disclosed slurry composition for a secondary battery negative electrode per 100 parts by mass of the previously described negative electrode active material is preferably 0.5 parts by mass or more, and is preferably 5.0 parts by mass or less. When the amount of the particulate polymer is 0.5 parts by mass or more per 100 parts by mass of the negative electrode active material, good binding of components of a negative electrode mixed material layer to one another and of the negative electrode mixed material layer to a current collector can be achieved, and negative electrode peel strength can be increased. Moreover, when the amount of the particulate polymer is 5.0 parts by mass or less per 100 parts by mass of the negative electrode active material, slurry composition producibility and secondary battery rate characteristics can be ensured.

[Functional Group Content/Acid Content Ratio X]

In the presently disclosed slurry composition for a secondary battery negative electrode, a functional group content/acid content ratio X calculated by formula (1)

$$X=(S/T)/U \qquad (1)$$

is preferably 1.51 or more, more preferably 1.80 or more, and even more preferably 2.00 or more, and is preferably 4.50 or less, and more preferably 4.30 or less. In formula (1), S represents the surface functional group content (%) of the carbon-based negative electrode active material, T represents the BET specific surface area ($m^2/g$) of the carbon-based negative electrode active material, and U represents the surface acid content (mmol/g) of the particulate polymer. When the value of X is within any of the ranges set forth above, good interaction between the carbon-based negative electrode active material and the particulate polymer enables improvement of slurry composition producibility and suppression of cell swelling and an increase in internal resistance in a secondary battery to be achieved in a good balance.

<Other Components>

Besides the components forth above, the presently disclosed slurry composition for a secondary battery negative electrode may further contain other components such as a conductive material, a water-soluble polymer, a reinforcing material, a leveling agent, and an electrolysis solution additive. These other components are not specifically limited so long as they do not influence the battery reactions, and commonly known examples thereof may be used such as described, for example, in WO 2012/115096 A1 and JP 2012-204303 A.

A conductive material such as acetylene black preferably has a BET specific surface area of 30 $m^2/g$ or more from a viewpoint of good conduction path formation in a negative electrode mixed material layer and increasing secondary battery rate characteristics. The amount of the conductive material per 100 parts by mass of the negative electrode active material is preferably 0.2 parts by mass or more, and more preferably 0.4 parts by mass or more, and is preferably 2 parts by mass or less, and more preferably 1.5 parts by mass or less. When the amount of the conductive material is 0.2 parts by mass or more per 100 parts by mass of the negative electrode active material, an increase in internal resistance of a secondary battery can be suppressed, and rate characteristics of the secondary battery can be further increased. Moreover, when the amount of the conductive material is 2 parts by mass or less per 100 parts by mass of the negative electrode active material, coating density of the slurry composition onto a current collector can be increased and cell swelling can be further suppressed while also increasing negative electrode peel strength.

Suitable examples of the water-soluble polymer include, but are not specifically limited to, carboxymethyl cellulose, salts of carboxymethyl cellulose, polyacrylic acid, and salts of polyacrylic acid. The 1 mass % aqueous solution viscosity of the water-soluble polymer is preferably 150 mPa·s or more, and more preferably 180 mPa·s or more, and is preferably 2,000 mPa·s or less, and more preferably 1,800 mPa·s or less. When the 1 mass % aqueous solution viscosity of the water-soluble polymer is 150 mPa·s or more, the water-soluble polymer can favorably function as a viscosity modifier, whereas when the 1 mass % aqueous solution viscosity of the water-soluble polymer is 2,000 mPa·s or less, an increase in internal resistance in a secondary battery can be suppressed, and rate characteristics of the secondary battery can be further increased. The amount of the water-soluble polymer may, for example, be at least 0.7 parts by mass and not more than 3.0 parts by mass per 100 parts by mass of the negative electrode active material.

<Production of Slurry Composition for Secondary Battery Negative Electrode>

The presently disclosed slurry composition for a secondary battery negative electrode can be produced by dispersing the above-described components in an aqueous medium that serves as a dispersion medium. Specifically, the slurry composition can be produced by mixing the above-described components with the aqueous medium using a mixer such as a ball mill, a sand mill, a bead mill, a pigment disperser, a grinding machine, an ultrasonic disperser, a homogenizer, a planetary mixer, or a FILMIX.

Although water is normally used as the aqueous medium, alternatively, an aqueous solution of a freely selected compound or a mixed solution of a small amount of an organic medium and water may be used. The solid content concentration of the slurry composition may be a concentration that enables homogeneous dispersion of the components. For example, the solid content concentration may be at least 30 mass % and not more than 90 mass %. Furthermore, the mixing of the above-described components with the aqueous medium can normally be performed for at least 10 minutes and not more than several hours at a temperature ranging from at least room temperature to not higher than 80° C.

(Secondary Battery Negative Electrode)

The presently disclosed negative electrode for a secondary battery can be produced using the presently disclosed slurry composition for a secondary battery negative electrode.

The presently disclosed negative electrode for a secondary battery includes a current collector and a negative electrode mixed material layer formed on the current collector. The negative electrode mixed material layer is obtained from the presently disclosed slurry composition for a secondary battery negative electrode. Components contained in the negative electrode mixed material layer are components that were contained in the presently disclosed slurry composition for a secondary battery negative electrode. Furthermore, the suitable ratio of these components is the same as the suitable ratio of these components in the slurry composition for a secondary battery negative electrode.

The presently disclosed negative electrode for a secondary battery can suppress cell swelling in a secondary battery while also enabling the secondary battery to display excellent rate characteristics.

<Production Method of Negative Electrode for Secondary Battery>

The presently disclosed negative electrode for a secondary battery can be produced, for example, through a step of applying the previously described slurry composition for a secondary battery negative electrode onto a current collector (application step) and a step of drying the slurry composition for a secondary battery negative electrode that has been applied onto the current collector to form a negative electrode mixed material layer on the current collector (drying step).

[Application Step]

The previously described slurry composition for a secondary battery negative electrode may be applied onto the current collector by any commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating applied onto the current collector before drying may be appropriately determined in accordance with the thickness of the negative electrode mixed material layer to be obtained after drying.

The current collector onto which the slurry composition is applied is a material having electrical conductivity and electrochemical durability. Specifically, the current collector may for example be made of iron, copper, aluminum, nickel, stainless steel, titanium, tantalum, gold, or platinum. Of these materials, copper foil is particularly preferable as a current collector used for a negative electrode. One of such materials may be used individually, or two or more of such materials may be used in combination in a freely selected ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, electron beams, or the like. The slurry composition dried on the current collector in this manner forms a negative electrode mixed material layer on the current collector, thereby providing a negative electrode for a secondary battery that includes the current collector and the negative electrode mixed material layer.

After the drying step, the negative electrode mixed material layer may be further subjected to pressure treatment by mold pressing, roll pressing, or the like. This pressure treatment enables improvement of peel strength of the negative electrode.

(Secondary Battery)

The presently disclosed secondary battery includes a positive electrode, a negative electrode, an electrolysis solution, and a separator, wherein the presently disclosed negative electrode for a secondary battery is used as the negative electrode. Through use of the presently disclosed negative electrode for a secondary battery, cell swelling in the presently disclosed secondary battery is suppressed, and the presently disclosed secondary battery is provided with excellent battery characteristics, such as rate characteristics. The following describes the positive electrode, the electrolysis solution, and the separator for an example in which the secondary battery is a lithium ion secondary battery, but this disclosure is not limited by the following example.

<Positive Electrode>

The positive electrode may be any known positive electrode that is used as a positive electrode for a lithium ion secondary battery. Specifically, the positive electrode that is used may for example be a positive electrode obtained by forming a positive electrode mixed material layer on a current collector.

The current collector may be made of a metal material such as aluminum. The positive electrode mixed material layer may be a layer containing a known positive electrode active material, conductive material, and binder.

<Electrolysis Solution>

The electrolysis solution may be formed by dissolving an electrolyte in a solvent.

The solvent may be an organic solvent that can dissolve an electrolyte. Specifically, the solvent may be an alkyl carbonate solvent to which a viscosity modification solvent is added. Examples of the alkyl carbonate solvent include ethylene carbonate, propylene carbonate, and γ-butyrolactone. Examples of the viscosity modification solvent include 2,5-dimethyltetrahydrofuran, tetrahydrofuran, diethyl carbonate, ethyl methyl carbonate, dimethyl carbonate, methyl acetate, dimethoxyethane, dioxolane, methyl propionate, and methyl formate.

The electrolyte may be a lithium salt. Examples of the lithium salt include lithium salts described in JP 2012-204303 A. Of these lithium salts, $LiPF_6$, $LiClO_4$, and $CF_3SO_3Li$ are preferred as electrolytes because they readily dissolve in organic solvents and exhibit a high degree of dissociation.

<Separator>

Examples of the separator include separators described in JP 2012-204303 A. Of these separators, a fine porous membrane made of polyolefinic resin (polyethylene, polypropylene, polybutene, or polyvinyl chloride) is preferred since such a membrane can reduce the total thickness of the separator, which increases the ratio of the electrode active material in the lithium ion secondary battery, and consequently increases the capacity per unit volume.

<Production Method of Secondary Battery>

The presently disclosed secondary battery may be produced, for example, by stacking the positive electrode and the negative electrode with the separator in-between, rolling or folding the resulting laminate in accordance with the battery shape as necessary to place the laminate in a battery container, injecting the electrolysis solution into the battery container, and sealing the container. In order to prevent pressure-increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of this disclosure based on examples. However, this disclosure is not limited to the following examples. In the following description, "%" and "parts" used to express quantities are by mass, unless otherwise specified.

The following methods were used in the examples and comparative examples to evaluate the surface functional group content of a carbon-based negative electrode active material, the surface acid content and volume average particle diameter D50 of a particulate polymer, the producibility of a slurry composition for a secondary battery negative electrode, the peel strength of a negative electrode for a secondary battery, and the initial cell swelling, cell swelling after 100 cycles, and rate characteristics of a secondary battery.

<Surface Functional Group Content (O/C Value)>

X-ray photoelectron spectroscopy was performed to determine the peak areas of C1s and O1s spectra. A ratio (%) of the oxygen atom (O) concentration at the surface of a carbon-based negative electrode active material relative to the carbon atom (C) concentration thereat (=O atom concentration/C atom concentration×100) was calculated based on the peak areas, and the calculated ratio was taken to be the surface functional group content (%). The X-ray photoelectron spectroscopy was performed using a VG Theta Probe produced by Thermo Fisher Scientific Inc.

<Surface Acid Content>

A glass vessel of 150 mL in capacity that had been cleaned with distilled water was charged with 50 g of a water dispersion containing a produced particulate polymer (solid content concentration adjusted to 2%). An electrolytic-conductivity meter was set up and stirring was performed. Note that the stirring was continued until the subsequently described addition of hydrochloric acid was complete.

A 0.1 N sodium hydroxide aqueous solution was added to the water dispersion containing the particulate polymer so that the electrical conductivity of the water dispersion containing the particulate polymer became 2.5 mS to 3.0 mS. The electrical conductivity was then measured after 6 minutes elapsed, and the resulting value was taken to be the electrical conductivity at the start of measurement.

Next, 0.5 mL of 0.1 N hydrochloric acid was added to the water dispersion containing the particulate polymer and the electrical conductivity was measured 30 seconds after this addition. Subsequently, a further 0.5 mL of 0.1 N hydrochloric acid was added and the electrical conductivity was measured 30 seconds after this addition. This operation was repeated in 30 second intervals until the electrical conductivity of the water dispersion containing the particulate polymer rose to at least as high as the electrical conductivity at the start of measurement.

The resulting electrical conductivity data were plotted on a graph with the electrical conductivity (units: mS) on the vertical axis (y-coordinate axis) and the cumulative amount of added hydrochloric acid (units: mmol) on the horizontal axis (x-coordinate axis). In this manner, a hydrochloric acid additive amount-electrical conductivity curve with three inflection points was obtained as illustrated in FIGURE. The x-coordinates of the three inflection points were taken to be P1, P2, and P3 in order from a smallest value. For the data in each of three sections (section from the zero x-coordinate to the coordinate P1, section from the coordinate P1 to the coordinate P2, and section from the coordinate P2 to the coordinate P3), linear approximations L1, L2, and L3 were calculated by the least squares method. The x-coordinate of the intersection between the linear approximation L1 and the linear approximation L2 was defined as A1 (mmol), and the x-coordinate of the intersection between the linear approximation L2 and the linear approximation L3 was defined as A2 (mmol).

The surface acid content per 1 g of the particulate polymer was determined by the following formula as a value (mmol/g) in terms of hydrochloric acid.

Surface acid content per 1 g of particulate polymer=$A2-A1$

<Volume Average Particle Diameter D50>

The volume average particle diameter D50 of a particulate polymer was measured using a laser diffraction/scattering particle size distribution analyzer (LS230 produced by Beckman Coulter, Inc.).

<Slurry Composition Producibility>

In production of a slurry composition for a lithium ion secondary battery negative electrode, the viscosity $\eta 0$ of a mixed liquid prior to addition of a particulate polymer-containing water dispersion was measured using a B-type viscometer (25° C., 60 rpm rotation speed). Thereafter, the viscosity $\eta 1$ of a slurry composition obtained through addition of the particulate polymer-containing water dispersion was measured under the same conditions, and the viscosity change rate (%) (=$\eta 1/\eta 0 \times 100$) was calculated. The viscosity change rate serves as an index expressing the tendency of slurry composition thickening to occur due to particulate polymer addition. For example, slurry composition producibility may be judged to be poor in a case in which this value is more than 110% and good in a case in which this value is 110% or less.

<Peel Strength>

A produced negative electrode was cut to a rectangular shape of 1.0 cm in width by 10 cm in length and was used as a test piece. The test piece was secured with the surface at the negative electrode mixed material layer side on top, and cellophane tape was attached to the surface at the negative electrode mixed material layer side of the test piece. Tape prescribed by JIS Z1522 was used as the cellophane tape. The cellophane tape was then peeled off from one end of the specimen at a rate of 50 mm/minute and an angle of 180° (i.e., in a direction toward the other end of the specimen) while measuring the stress during peeling. This measurement was performed 10 times and an average value of the stress was determined. The average value was taken to be the peel strength (N/m). A larger peel strength indicates better binding strength of the negative electrode mixed material layer to the current collector.

<Cell Swelling (Initial)>

The initial capacity of a produced lithium ion secondary battery was confirmed and then the lithium ion secondary battery was fully charged though 4.2 V CC-CV charging (cut-off condition 0.02 C) at 25° C. At this time, the cell thickness was measured at 10 points using a thickness meter, and the measured values were averaged to calculate the average thickness T0. Next, 10 charge/discharge cycles (4.2 V-3.0 V) were carried out at 1 C and 25° C. Thereafter, the average cell thickness T1 when fully charged was measured in the same way as T0, and the thickness change rate (%) (=(T1−T0)/T0×100) was calculated. A smaller thickness change rate indicates greater suppression of initial cell swelling.

<Cell Swelling (after 100 Cycles)>

The initial capacity of a produced lithium ion secondary battery was confirmed and then the lithium ion secondary battery was fully charged though 4.2 V CC-CV charging (cut-off condition 0.02 C) at 25° C. At this time, the cell thickness was measured at 10 points using a thickness meter, and the measured values were averaged to calculate the average thickness T0. Next, 100 charge/discharge cycles (4.2 V-3.0 V) were carried out at 1 C and 25° C. Thereafter, the average cell thickness T2 when fully charged was measured in the same way as T0, and the thickness change rate (%) (=(T2−T0)/T0×100) was calculated. A smaller thickness change rate indicates greater suppression of cell swelling after 100 cycles.

<Rate Characteristics>

The initial capacity of a produced lithium ion secondary battery was confirmed and then the lithium ion secondary battery was fully charged though 4.2 V CC-CV charging (cut-off condition 0.02 C) at 25° C. Thereafter, CC discharging of the lithium ion secondary battery was performed to 3.0 V at 0.2 C in an environment of −10° C. and the discharge capacity C1 in this discharging was obtained. The lithium ion secondary battery was once again fully charged though 4.2 V CC-CV charging (cut-off condition 0.02 C) at 25° C. Thereafter, CC discharging of the lithium ion secondary battery was performed to 3.0 V at 1 C in an environment of −10° C., and the discharge capacity C2 in this discharging was obtained. A ratio of C2 relative to C1 (C2/C1) was calculated. A larger value for this ratio indicates that a lithium ion secondary battery has better rate characteristics.

Example 1

<Production of Carbon-Based Negative Electrode Active Material>

A Henschel mixer was used to mix 30 parts of tar pitch as a coating formation material of low-crystallinity carbon added relative to 100 parts of spheroidized graphite (volume average particle diameter D50: 15 μm; tap density: 0.85 g/cm$^3$, BET specific surface area: 6.0 m$^2$/g) as core particles for 30 minutes at 200° C. The resulting mixture was pre-fired at 1000° C. in a nitrogen atmosphere, and was subsequently pulverized and further fired at 2600° C. in a nitrogen atmosphere to obtain a composite carbon material. This composite carbon material was pulverized (mechanochemically treated) using a MECHANO FUSION System produced by Hosokawa Micron Corporation to obtain a carbon-based negative electrode active material A. The surface functional group content and the BET specific surface area of the carbon-based negative electrode active material A were measured. The results are shown in Table 1.

<Production of Particulate Polymer>

Polymerization was initiated by starting addition of a mixture of 60.5 parts of styrene as an aromatic vinyl monomer, 35 parts of 1,3-butadiene as an aliphatic conjugated diene monomer, 3.5 parts of itaconic acid as an acidic group-containing monomer, 0.25 parts of tert-dodecyl mercaptan as a chain transfer agent, and 0.35 parts of sodium lauryl sulfate as an emulsifier from a vessel A containing this mixture, to a pressure vessel B, and simultaneously starting addition of 1 part of potassium persulfate as a polymerization initiator to the pressure vessel B. The reaction temperature was maintained at 75° C.

Once 4 hours had elapsed from the start of polymerization (once 70% of the total monomer composition had been added), 1 part of 2-hydroxyethyl acrylate was added as a hydroxy group-containing (meth)acrylic acid ester monomer to the pressure vessel B over 1.5 hours.

Addition of the total amount of these monomer compositions was complete once 5.5 hours had elapsed from the start of polymerization. Thereafter, further heating was performed to 85° C. and the reaction was continued for a further 6 hours.

When the polymerization conversion rate reached 97%, cooling was performed to stop the reaction and yield a mixture containing a particulate polymer. The mixture containing the particulate polymer was adjusted to pH 8 through addition of 5% sodium hydroxide aqueous solution. Thereafter, unreacted monomers were removed by distillation under heating and reduced pressure. Cooling was subsequently performed to obtain a water dispersion containing the desired particulate polymer (solid content concentration: 40%). The water dispersion containing the particulate polymer was used to measure the surface acid content and the volume average particle diameter D50. The results are shown in Table 1.

<Production of Slurry Composition for Lithium Ion Secondary Battery Negative Electrode>

A planetary mixer equipped with a disper blade was charged with 100 parts of the above-described carbon-based negative electrode active material as a negative electrode active material, 1.5 parts in terms of solid content of carboxymethyl cellulose (CMC; 1 mass % aqueous solution viscosity: 250 mPa·s) as a water-soluble polymer, and 1 part of acetylene black (BET specific surface area: 68 m$^2$/g) as a conductive material. The mixture of these materials was adjusted to a solid content concentration of 56% with deionized water and was then mixed for 60 minutes at 25°

C. Subsequently, the mixture was adjusted to a solid content concentration of 52% with deionized water and was then further mixed for 15 minutes at 25° C. to obtain a mixed liquid.

Deionized water and 1.6 parts of the water dispersion containing the particulate polymer (in terms of solid content of the particulate polymer) were added to the mixed liquid, the final solid content concentration was adjusted to 50%, and further mixing was performed for 10 minutes. The resulting mixed liquid was subjected to a defoaming process under reduced pressure to yield a slurry composition for a lithium ion secondary battery negative electrode. Note that in production of the slurry composition for a lithium ion secondary battery negative electrode, producibility of the slurry composition was evaluated as previously described. The results are shown in Table 1.

<Production of Negative Electrode for Lithium Ion Secondary Battery>

A comma coater was used to apply the slurry composition for a lithium ion secondary battery negative electrode onto copper foil (current collector) of 15 μm in thickness such as to have a coating weight of 9 mg/cm² to 10 mg/cm². The copper foil coated with the slurry composition for a lithium ion secondary battery negative electrode was conveyed inside a 60° C. oven for 2 minutes at a speed of 0.5 m/minute to dry the slurry composition for a lithium ion secondary battery negative electrode. Thereafter, heat treatment was performed for 2 minutes in a 120° C. oven to obtain a negative electrode web.

The obtained negative electrode web was pressed using a roll pressing machine such as to achieve a negative electrode mixed material layer density of 1.6 g/cm³ to 1.7 g/cm³ and obtain a negative electrode for a lithium ion secondary battery. Peel strength was evaluated using the negative electrode for a lithium ion secondary battery. The results are shown in Table 1.

<Production of Positive Electrode for Lithium Ion Secondary Battery>

A slurry composition for a lithium ion secondary battery positive electrode was produced by using a planetary mixer to mix 100 parts of $LiCoO_2$ as a positive electrode active material, 2 parts of acetylene black (HS-100 produced by Denki Kagaku Kogyo Kabushiki Kaisha) as a conductive material, and 2 parts of PVDF (polyvinylidene fluoride; KF-1100 produced by Kureha Corporation) as a binder with 2-methyl pyrrolidone added such that the total solid content concentration was 67%.

A comma coater was used to apply the obtained slurry composition for a lithium ion secondary battery positive electrode onto aluminum foil (current collector) of 20 μm in thickness. The aluminum foil coated with the slurry composition for a lithium ion secondary battery positive electrode was conveyed inside a 60° C. oven for 2 minutes at a speed of 0.5 m/minute to dry the slurry composition for a lithium ion secondary battery positive electrode. Thereafter, heat treatment was performed for 2 minutes in a 120° C. oven to obtain a positive electrode web.

The obtained positive electrode web was pressed using a roll pressing machine such as to achieve a positive electrode mixed material layer density of 3.40 g/cm³ to 3.50 g/cm³ and obtain a positive electrode for a lithium ion secondary battery.

<Production of Lithium Ion Secondary Battery>

A single-layer separator made of polypropylene (width 65 mm, length 500 mm, thickness 25 μm; produced by a dry method; porosity 55%) was prepared and was cut out to 50 mm×200 mm.

The produced positive electrode was cut out to 45 mm×150 mm and the produced negative electrode was cut out to 47 mm×155 mm. The cut-out positive electrode, separator, and negative electrode were stacked in this order and were wound to obtain a wound product that was then placed in an aluminum packing case. Thereafter, the case was filled with an $LiPF_6$ solution of 1.0M in concentration as an electrolysis solution (mixed solvent of ethylene carbonate (EC)/ethyl methyl carbonate (EMC)=3/7 (volume ratio) used as solvent; containing 2 mass % of vinylene carbonate as additive). The aluminum packing case was then closed by heat sealing at 150° C. to tightly seal an opening of the aluminum packing case, and thereby produce a lithium ion secondary battery. Initial cell swelling, cell swelling after 100 cycles, and rate characteristics were evaluated using the obtained lithium ion secondary battery. The results are shown in Table 1.

Example 2

A carbon-based negative electrode active material B was obtained in the same way as in Example 1 with the exception that the additive amount of tar pitch was 25 parts per 100 parts of spheroidized graphite.

Moreover, a particulate polymer, a slurry composition for a lithium ion secondary battery negative electrode, a negative electrode for a lithium ion secondary battery, a positive electrode for a lithium ion secondary battery, and a lithium ion secondary battery were produced and evaluations were performed in the same way as in Example 1 with the exception that the obtained carbon-based negative electrode active material B was used instead of the carbon-based negative electrode active material A. The results are shown in Table 1.

Example 3

A carbon-based negative electrode active material C was obtained in the same way as in Example 1 with the exception that the rotation speed of the device used in mechanochemical treatment was increased.

Moreover, a particulate polymer, a slurry composition for a lithium ion secondary battery negative electrode, a negative electrode for a lithium ion secondary battery, a positive electrode for a lithium ion secondary battery, and a lithium ion secondary battery were produced and evaluations were performed in the same way as in Example 1 with the exception that the obtained carbon-based negative electrode active material C was used instead of the carbon-based negative electrode active material A. The results are shown in Table 1.

Examples 4, 7, and 13

A carbon-based negative electrode active material, a particulate polymer, a slurry composition for a lithium ion secondary battery negative electrode, a negative electrode for a lithium ion secondary battery, a positive electrode for a lithium ion secondary battery, and a lithium ion secondary battery were produced and evaluations were performed in the same way as in Example 1 with the exception that the monomers used in production of the particulate polymer were changed as indicated in Table 1. The results are shown in Table 1.

Examples 5 and 12

A carbon-based negative electrode active material, a particulate polymer, a slurry composition for a lithium ion secondary battery negative electrode, a negative electrode for a lithium ion secondary battery, a positive electrode for a lithium ion secondary battery, and a lithium ion secondary battery were produced and evaluations were performed in the same way as in Example 1 with the exception that the amount of sodium lauryl sulfate used in production of the particulate polymer was changed to 0.15 parts and 0.40 parts in Examples 5 and 12, respectively. The results are shown in Table 1.

Example 6

A carbon-based negative electrode active material D was obtained in the same way as in Example 1 with the exception that the rotation speed of the device used in mechanochemical treatment was decreased.

Moreover, a particulate polymer, a slurry composition for a lithium ion secondary battery negative electrode, a negative electrode for a lithium ion secondary battery, a positive electrode for a lithium ion secondary battery, and a lithium ion secondary battery were produced and evaluations were performed in the same way as in Example 1 with the exception that the obtained carbon-based negative electrode active material D was used instead of the carbon-based negative electrode active material A. The results are shown in Table 1.

Examples 8 and 9

A carbon-based negative electrode active material, a particulate polymer, a slurry composition for a lithium ion secondary battery negative electrode, a negative electrode for a lithium ion secondary battery, a positive electrode for a lithium ion secondary battery, and a lithium ion secondary battery were produced and evaluations were performed in the same way as in Example 1 with the exception that CMC having a 1 mass % aqueous solution viscosity of 1,000 mPa·s and CMC having a 1 mass % aqueous solution viscosity of 1,900 mPa·s were used in production of the slurry composition for a lithium ion secondary battery negative electrode in Examples 8 and 9, respectively, instead of CMC having a 1 mass % aqueous solution viscosity of 250 mPa·s. The results are shown in Table 1.

Examples 10 and 11

A carbon-based negative electrode active material, a particulate polymer, a slurry composition for a lithium ion secondary battery negative electrode, a negative electrode for a lithium ion secondary battery, a positive electrode for a lithium ion secondary battery, and a lithium ion secondary battery were produced and evaluations were performed in the same way as in Example 1 with the exception that the additive amount of the conductive material in production of the slurry composition for a lithium ion secondary battery negative electrode was changed to 1.8 parts per 100 parts of the negative electrode active material and 0.3 parts per 100 parts of the negative electrode active material in Examples 10 and 11, respectively. The results are shown in Table 1.

Comparative Example 1

A Henschel mixer was used to mix 15 parts of tar pitch as a coating formation material of low-crystallinity carbon added relative to 100 parts of spheroidized graphite (volume average particle diameter D50: 15 µm; tap density: 0.85 g/cm$^3$, BET specific surface area: 6.0 m$^2$/g) as core particles for 30 minutes at 200° C. The resulting mixture was pre-fired at 1000° C. in a nitrogen atmosphere, was subsequently further fired at 2600° C. in a nitrogen atmosphere, and was pulverized using a KRYPTRON produced by EarthTechnica Co., Ltd. to obtain a carbon-based negative electrode active material E.

A particulate polymer, a slurry composition for a lithium ion secondary battery negative electrode, a negative electrode for a lithium ion secondary battery, a positive electrode for a lithium ion secondary battery, and a lithium ion secondary battery were produced and evaluations were performed in the same way as in Example 1 with the exception that the obtained carbon-based negative electrode active material E was used instead of the carbon-based negative electrode active material A. The results are shown in Table 1.

Comparative Example 2

A Henschel mixer was used to mix 30 parts of tar pitch as a coating formation material of low-crystallinity carbon added relative to 100 parts of spheroidized graphite (volume average particle diameter D50: 15 µm; tap density: 0.85 g/cm$^3$; BET specific surface area: 6.0 m$^2$/g) as core particles for 30 minutes at 200° C. The resulting mixture was pre-fired at 1000° C. in a nitrogen atmosphere, was subsequently pulverized using a KRYPTRON produced by EarthTechnica Co., Ltd., and was further fired at 2600° C. in a nitrogen atmosphere to obtain a carbon-based negative electrode active material F.

A particulate polymer, a slurry composition for a lithium ion secondary battery negative electrode, a negative electrode for a lithium ion secondary battery, a positive electrode for a lithium ion secondary battery, and a lithium ion secondary battery were produced and evaluations were performed in the same way as in Example 1 with the exception that the obtained carbon-based negative electrode active material F was used instead of the carbon-based negative electrode active material A. The results are shown in Table 1.

Comparative Example 3

A carbon-based negative electrode active material, a particulate polymer, a slurry composition for a lithium ion secondary battery negative electrode, a negative electrode for a lithium ion secondary battery, a positive electrode for a lithium ion secondary battery, and a lithium ion secondary battery were produced and evaluations were performed in the same way as in Example 1 with the exception that the monomers used in production of the particulate polymer were changed as indicated in Table 1. The results are shown in Table 1.

Comparative Example 4

A carbon-based negative electrode active material G was obtained in the same way as in Example 3 with the exception that the rotation speed of the device used in mechanochemical treatment was further increased.

Production of a slurry composition for a lithium ion secondary battery negative electrode was attempted in the same way as in Example 1 with the exception that the obtained carbon-based negative electrode active material G was used instead of the carbon-based negative electrode active material A, but it was not possible to produce a slurry composition due to excessive thickening.

In Table 1 shown below:
"ST" indicates styrene;
"BD" indicates 1,3-butadiene;
"IA" indicates itaconic acid;
"AA" indicates acrylic acid; and
"2-HEA" indicates 2-hydroxyethyl acrylate.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Carbon-based negative electrode active material | Type | Active material A | Active material B | Active material C | Active material A | Active material A | Active material D | Active material A | Active material A | Active material A |
|  | Surface functional group content [%] | 1.1 | 1.1 | 1.4 | 1.1 | 1.1 | 1.1 | 1.1 | 1.1 | 1.1 |
|  | BET specific surface area [m²/g] | 1.5 | 2.2 | 1.5 | 1.5 | 1.5 | 1.1 | 1.5 | 1.5 | 1.5 |
|  | Amount [parts by mass] | 100 | 100 | 100 | 100 | 100 | 100 | 100 | 100 | 100 |
| Particulate polymer | Surface acid content [mmol/g] | 0.24 | 0.24 | 0.24 | 0.21 | 0.23 | 0.24 | 1.3 | 0.24 | 0.24 |
|  | Volume average particle diameter D50 [nm] | 150 | 150 | 150 | 150 | 270 | 150 | 150 | 150 | 150 |
|  | Monomer composition [mass %] ST | 60.5 | 60.5 | 60.5 | 60.5 | 60.5 | 60.5 | 55.5 | 60.5 | 60.5 |
|  | BD | 35 | 35 | 35 | 36.0 | 35 | 35 | 35 | 35 | 35 |
|  | IA | 3.5 | 3.5 | 3.5 | 2.5 | 3.5 | 3.5 | — | 3.5 | 3.5 |
|  | AA | — | — | — | — | — | — | 8.5 | — | — |
|  | 2-HEA | 1 | 1 | 1 | 1 | 1 | 1 | 1 | 1 | 1 |
|  | Amount [parts by mass] | 1.6 | 1.6 | 1.6 | 1.6 | 1.6 | 1.6 | 1.6 | 1.6 | 1.6 |
| Conductive material (acetylene black) | BET specific surface area [m²/g] | 68 | 68 | 68 | 68 | 68 | 68 | 68 | 68 | 68 |
|  | Amount [parts by mass] | 1 | 1 | 1 | 1 | 1 | 1 | 1 | 1 | 1 |
| Water-soluble polymer (CMC) | 1 Mass % viscosity [mPa·s] | 250 | 250 | 250 | 250 | 250 | 250 | 250 | 1000 | 1900 |
|  | Amount [parts by mass] | 1.5 | 1.5 | 1.5 | 1.5 | 1.5 | 1.5 | 1.5 | 1.5 | 1.5 |
| Functional group content/acid content ratio X [—] |  | 3.06 | 2.08 | 3.89 | 3.49 | 3.19 | 4.17 | 0.56 | 3.06 | 3.06 |
| Cell swelling (initial) [%] |  | 3.5 | 4.5 | 4 | 4.5 | 3.5 | 3.5 | 3.5 | 3.5 | 3.5 |
| Cell swelling (after 100 cycles) [%] |  | 7 | 8.5 | 8 | 9 | 8 | 8 | 9 | 8 | 8 |
| Rate characteristics [—] |  | 0.55 | 0.53 | 0.54 | 0.53 | 0.52 | 0.49 | 0.51 | 0.50 | 0.46 |
| Peel strength [N/m] |  | 3.2 | 3.1 | 3.0 | 3.0 | 2.4 | 2.8 | 2.3 | 3.5 | 3.9 |
| Slurry composition producibility [%] |  | 98 | 100 | 105 | 108 | 95 | 97 | 96 | 98 | 95 |

|  |  | Example 10 | Example 11 | Example 12 | Example 13 | Comparative Example 1 | Comparative Example 2 | Comparative Example 3 | Comparative Example 4 |
|---|---|---|---|---|---|---|---|---|---|
| Carbon-based negative electrode active material | Type | Active material A | Active material A | Active material A | Active material A | Active material E | Active material F | Active material A | Active material G |
|  | Surface functional group content [%] | 1.1 | 1.1 | 1.1 | 1.1 | 1.1 | 0.6 | 1.1 | 2.0 |
|  | BET specific surface area [m²/g] | 1.5 | 1.5 | 1.5 | 1.5 | 3.5 | 1.6 | 1.5 | 1.8 |
|  | Amount [parts by mass] | 100 | 100 | 100 | 100 | 100 | 100 | 100 | 100 |
| Particulate polymer | Surface acid content [mmol/g] | 0.24 | 0.24 | 0.24 | 0.8 | 0.24 | 0.24 | 0.1 | 0.24 |
|  | Volume average particle diameter D50 [nm] | 150 | 150 | 125 | 150 | 150 | 150 | 150 | 150 |
|  | Monomer composition [mass %] ST | 60.5 | 60.5 | 60.5 | 58.0 | 60.5 | 60.5 | 60.5 | 60.5 |
|  | BD | 35 | 35 | 35 | 35 | 37.5 | 35 | 35 | 35 |
|  | IA | 3.5 | 3.5 | 3.5 | — | 1.0 | 3.5 | 3.5 | 3.5 |
|  | AA | — | — | — | 6.0 | — | — | — | — |
|  | 2-HEA | 1 | 1 | 1 | 1 | 1 | 1 | 1 | 1 |
|  | Amount [parts by mass] | 1.6 | 1.6 | 1.6 | 1.6 | 1.6 | 1.6 | 1.6 | 1.6 |
| Conductive material (acetylene black) | BET specific surface area [m²/g] | 68 | 68 | 68 | 68 | 68 | 68 | 68 | 68 |
|  | Amount [parts by mass] | 1.8 | 0.3 | 1 | 1 | 1 | 1 | 1 | 1 |
| Water-soluble polymer (CMC) | 1 Mass % viscosity [mPa·s] | 250 | 250 | 250 | 250 | 250 | 250 | 250 | 250 |
|  | Amount [parts by mass] | 1.5 | 1.5 | 1.5 | 1.5 | 1.5 | 1.5 | 1.5 | 1.5 |
| Functional group content/acid content ratio X [—] |  | 3.06 | 3.06 | 3.06 | 0.92 | 1.31 | 1.56 | 7.33 | 4.63 |
| Cell swelling (initial) [%] |  | 4.5 | 3.5 | 4.5 | 3.5 | 7 | 3.5 | 6 | — |
| Cell swelling (after 100 cycles) [%] |  | 8 | 7.5 | 10 | 9 | 12 | 7.5 | 12 | — |
| Rate characteristics [—] |  | 0.56 | 0.46 | 0.53 | 0.55 | 0.52 | 0.43 | 0.51 | — |
| Peel strength [N/m] |  | 2.6 | 3.2 | 2.3 | 2.8 | 3.5 | 3.1 | 3.0 | — |
| Slurry composition producibility [%] |  | 102 | 98 | 110 | 97 | 99 | 104 | 150 | — |

It can be seen from Examples 1 to 13 and Comparative Examples 1 to 4 in Table 1 that in the case of Examples 1 to 13, it was possible to ensure a good balance of producibility of the slurry composition for a secondary battery negative electrode, and rate characteristics and suppression of cell swelling of the secondary battery.

Examples 1, 2, and 6 in Table 1 demonstrate that secondary battery rate characteristics can be further improved while also further suppressing cell swelling by adjusting the specific surface area of the carbon-based negative electrode active material.

Moreover, Examples 1 and 3 in Table 1 demonstrate that slurry composition producibility can be further improved by adjusting the surface functional group content of the carbon-based negative electrode active material.

Furthermore, Examples 1, 4, 7, and 13 in Table 1 demonstrate that slurry composition producibility can be further improved while also further suppressing secondary battery cell swelling, and negative electrode peel strength can be improved by adjusting the surface acid content of the particulate polymer.

Also, Examples 1, 5, and 12 in Table 1 demonstrate that slurry composition producibility can be further improved while also further suppressing secondary battery cell swelling, and negative electrode peel strength can be improved by adjusting the volume average particle diameter D50 of the particulate polymer.

Moreover, Examples 1, 8, and 9 in Table 1 demonstrate that secondary battery rate characteristics can be further improved by adjusting the 1 mass % aqueous solution viscosity of the CMC used as a water-soluble polymer.

Furthermore, Examples 1, 10, and 11 in Table 1 demonstrate that secondary battery rate characteristics can be further improved while also further suppressing cell swelling, and negative electrode peel strength can be improved by adjusting the amount of acetylene black used as a conductive material.

INDUSTRIAL APPLICABILITY

According to this disclosure, it is possible to provide a slurry composition for a secondary battery negative electrode that has excellent producibility and can suppress cell swelling and an increase in internal resistance in a secondary battery.

Moreover, according to this disclosure, it is possible to provide a negative electrode for a secondary battery that can suppress cell swelling and an increase in internal resistance in a secondary battery.

Furthermore, according to this disclosure, it is possible to provide a secondary battery in which cell swelling is suppressed and that has excellent rate characteristics.

The invention claimed is:

1. A slurry composition for a secondary battery negative electrode comprising a negative electrode active material, a particulate polymer, and water, wherein
the negative electrode active material includes a carbon-based negative electrode active material having a surface functional group content of more than 1.0% and not more than 1.5%, and a BET specific surface area of 2.5 m$^2$/g or less, and
the particulate polymer has a surface acid content of at least 0.2 mmol/g and not more than 2.0 mmol/g, and wherein
the surface functional group is an oxygen atom-containing functional group, and
the surface functional group content is a value obtained as a ratio of the oxygen atom concentration at the surface of a carbon-based negative electrode active material relative to the carbon atom concentration thereat based on the peak area C1s and O1s spectra determined with X-ray photoelectron spectroscopy.

2. A slurry composition for a secondary battery negative electrode comprising a negative electrode active material, a particulate polymer, and water, wherein
the negative electrode active material includes a carbon-based negative electrode active material having a surface functional group content of at least 0.9% and not more than 1.5%, and a BET specific surface area of 2.5 m$^2$/g or less,
the particulate polymer has a surface acid content of at least 0.2 mmol/g and not more than 2.0 mmol/g,
the surface functional group is an oxygen atom-containing functional group,
the surface functional group content is a value obtained as a ratio of the oxygen atom concentration at the surface of a carbon-based negative electrode active material relative to the carbon atom concentration thereat based on the peak area C1s and O1s spectra determined with X-ray photoelectron spectroscopy, and
ratio X calculated by formula (1)

$$X=(S/T)/U \tag{1}$$

is at least 1.51 and not more than 4.50, where S represents the surface functional group content of the carbon-based negative electrode active material in %, T represents the BET specific surface area of the carbon-based negative electrode active material in m$^2$/g, and U represents the surface acid content of the particulate polymer in mmol/g.

3. The slurry composition for a secondary battery negative electrode according to claim 1, wherein
the BET specific surface area of the carbon-based negative electrode active material is 1.0 m$^2$/g or more.

4. The slurry composition for a secondary battery negative electrode according to claim 1, wherein
the particulate polymer has a volume average particle diameter D50 of at least 120 nm and not more than 500 nm.

5. The slurry composition for a secondary battery negative electrode according to claim 1, further comprising
a conductive material having a BET specific surface area of 30 m$^2$/g or more in an amount of at least 0.2 parts by mass and not more than 2 parts by mass per 100 parts by mass of the negative electrode active material.

6. The slurry composition for a secondary battery negative electrode according to claim 1, further comprising
a water-soluble polymer having a 1 mass % aqueous solution viscosity of at least 150 mPa·s and not more than 2,000 mPa·s.

7. A negative electrode for a secondary battery comprising a negative electrode mixed material layer obtained using the slurry composition for a secondary battery negative electrode according to claim 1.

8. A secondary battery comprising a positive electrode, a negative electrode, a separator, and an electrolysis solution, wherein
the negative electrode is the negative electrode for a secondary battery according to claim 7.

9. The slurry composition for a secondary battery negative electrode according to claim 2, wherein
the BET specific surface area of the carbon-based negative electrode active material is 1.0 m$^2$/g or more.

10. The slurry composition for a secondary battery negative electrode according to claim 2, wherein
   the particulate polymer has a volume average particle diameter D50 of at least 120 nm and not more than 500 nm.

11. The slurry composition for a secondary battery negative electrode according to claim 2, further comprising
   a conductive material having a BET specific surface area of 30 m$^2$/g or more in an amount of at least 0.2 parts by mass and not more than 2 parts by mass per 100 parts by mass of the negative electrode active material.

12. The slurry composition for a secondary battery negative electrode according to claim 2, further comprising
   a water-soluble polymer having a 1 mass % aqueous solution viscosity of at least 150 mPa·s and not more than 2,000 mPa·s.

13. A negative electrode for a secondary battery comprising a negative electrode mixed material layer obtained using the slurry composition for a secondary battery negative electrode according to claim 2.

14. A secondary battery comprising a positive electrode, a negative electrode, a separator, and an electrolysis solution, wherein
   the negative electrode is the negative electrode for a secondary battery according to claim 13.

* * * * *